(12) United States Patent  
Ohkawa

(10) Patent No.: US 8,164,809 B2  
(45) Date of Patent: Apr. 24, 2012

(54) IMAGE PROCESSING APPARATUS AND METHOD

(75) Inventor: Mieko Ohkawa, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 594 days.

(21) Appl. No.: 12/357,985

(22) Filed: Jan. 22, 2009

(65) Prior Publication Data

US 2009/0190181 A1    Jul. 30, 2009

(30) Foreign Application Priority Data

Jan. 24, 2008   (JP) ................................ 2008-013794

(51) Int. Cl.
*H04N 1/40* (2006.01)
*H04N 1/409* (2006.01)

(52) U.S. Cl. ......... 358/518; 358/448; 358/520; 358/1.9; 358/3.23; 358/3.27; 382/162; 382/167

(58) Field of Classification Search ................. 358/448, 358/461, 463, 464, 518, 519, 520, 521, 522, 358/1.9, 1.14, 3.26, 3.27; 382/162, 165, 382/167, 170, 173, 176, 274, 275
See application file for complete search history.

(56) References Cited

U.S. PATENT DOCUMENTS

| | | | | |
|---|---|---|---|---|
| 5,418,574 | A * | 5/1995 | Miyabata et al. | 348/625 |
| 5,646,744 | A * | 7/1997 | Knox | 358/448 |
| 6,031,581 | A * | 2/2000 | Harrington | 358/532 |
| 6,227,725 | B1 * | 5/2001 | Ancin et al. | 358/1.9 |
| 7,209,599 | B2 * | 4/2007 | Simske et al. | 382/275 |
| 7,292,375 | B2 * | 11/2007 | Nishida | 358/3.26 |
| 7,362,895 | B2 * | 4/2008 | Masumura et al. | 382/274 |
| 7,468,821 | B2 * | 12/2008 | Hashiguchi et al. | 358/520 |
| 7,620,359 | B2 * | 11/2009 | Gardner et al. | 399/364 |
| 7,620,360 | B2 * | 11/2009 | Heydinger et al. | 399/374 |
| 7,636,492 | B2 * | 12/2009 | Maurer | 382/274 |
| 2002/0071131 | A1 * | 6/2002 | Nishida | 358/1.9 |
| 2003/0072044 | A1 * | 4/2003 | Hashiguchi et al. | 358/520 |
| 2004/0008884 | A1 * | 1/2004 | Simske et al. | 382/170 |
| 2004/0169890 | A1 * | 9/2004 | Maurer | 358/3.27 |
| 2004/0169891 | A1 * | 9/2004 | Maurer | 358/3.26 |
| 2005/0105147 | A1 * | 5/2005 | Gruzdev et al. | 358/518 |
| 2006/0263125 | A1 * | 11/2006 | Gardner et al. | 399/364 |
| 2006/0263126 | A1 * | 11/2006 | Heydinger et al. | 399/364 |
| 2009/0161124 | A1 * | 6/2009 | Tamura | 358/1.1 |
| 2009/0268051 | A1 * | 10/2009 | Utsugi | 348/223.1 |

FOREIGN PATENT DOCUMENTS

JP   2001-169080   6/2001
JP   2001-313830   11/2001

OTHER PUBLICATIONS

Japanese Office Action mailed Jun. 2, 2009.

* cited by examiner

*Primary Examiner* — Kimberly A Williams
(74) *Attorney, Agent, or Firm* — Finnegan, Henderson, Farabow, Garrett & Dunner, L.L.P.

(57) ABSTRACT

Disclosed is an image processing apparatus, including: a comparing and detecting section for comparing two image data, which respectively obtained by nearly simultaneously reading both sides of a document, on a pixel to pixel basis and detecting a pixel, on which off-set arises, from the two image data based on a comparison result obtained by comparing the two image data; and a correcting section for correcting at least any one of brightness, hue and chroma based on information including brightness and hue of the detected pixel.

18 Claims, 5 Drawing Sheets

IMAGE PROCESSING APPARATUS AND METHOD

BACKGROUND OF THE INVENTION

1. Field of the Invention

The present invention relates to an image processing apparatus and method.

2. Description of the Related Art

In recent years, a simultaneous reading system capable of reading images from both sides of a document nearly simultaneously and executing image processing to the read image data is in widespread use. According to the system, reading speed can be improved compared with a traditional system that reads one side of a document at a time. Moreover, the simultaneous reading system can prevent the document from damages arise from an inverting motion, because the system needs no inverting motion.

Here, "off-set" is pointed out as a problem of the simultaneous reading system. Off-set means that an image of one side of a document appears into the other side thereof when forming an image from image data obtained by reading both sides of the document.

The off-set arises for the reason that, when reading sections respectively reads images arranged in both sides of the document, light irradiated to one side of the document transmits the document, then read by the reading section arranged in another side of the document.

To solve the above-mentioned off-set, it is required to properly correct the image data obtained by reading the document, after the reading sections have read images of both sides of the document.

Japanese Patent Application Laid-Open Publication No. 2001-313830 discloses an image processing apparatus, which prevents off-set by executing correction for deleting image data obtained from one side of a document via a light transmitted through the document from an image data obtained from the other side of the document by a reading section.

To put it concretely, the reading section arranged in the other side of the document detects information including brightness or hue of the image data about the other side of the document from the light transmitted through the document. Then, the reading section deletes the detected information about brightness or hue from the image data obtained by reading the other side of the document. Moreover, the apparatus is intended to prevent off-set by correcting brightness or hue included in the deletion processed image data based on the detected information about brightness or hue.

SUMMARY OF THE INVENTION

However, in the image processing apparatus disclosed in Japanese Patent Application Laid-Open Publication No. 2001-313830, even necessary information comes to be deleted when executing correction process for preventing off-set to a document of colored paper. Because, image data transmitted through the document from the one side thereof to be obtained by a reading section includes information about the basic color of the document of a colored paper, and the information about brightness or hue of the colored paper gets to be deleted from total image data obtained by the reading section.

Moreover, information about chroma difference is not detected, though the traditional image processing apparatus prevents off-set by correcting information including brightness or hue, the information being transmitted through the document from the one side of the document. Therefore, the traditional image processing apparatus can not correct off-set that arises from chroma difference.

The present invention has been achieved to solve the problem, and an object of the present invention is to provide an image processing apparatus capable of preventing off-set based on information about brightness, hue and chroma without spoiling image data obtained from reading target surfaces.

According to a first aspect of the present invention, there is provided an image processing apparatus, including: a comparing and detecting section for comparing two image data, which respectively obtained by simultaneously reading both sides of a document, on a pixel to pixel basis and detecting a pixel, on which off-set arises, from the two image data based on a comparison result obtained by comparing the two image data; and a correcting section for correcting at least any one of brightness, hue and chroma of the detected pixel based on information including brightness and hue of the detected pixel.

According to a second aspect of the present invention, there is provided a method for image processing, including the steps of: comparing two image data, which respectively obtained by simultaneously reading both sides of a document, on a pixel to pixel basis and detecting a pixel, on which off-set arises, from the two image data based on a comparison result obtained by comparing the two image data; and correcting at least any one of brightness, hue and chroma of the detected pixel based on information including brightness and hue of the detected pixel.

According to the first and the second aspect of the present invention, it is capable of detecting pixels, on which off-set arises, based on information about brightness or hue by comparing the two image data read by reading sections of simultaneous reading system. Then, brightness, hue and chroma of detected pixels can be corrected. Therefore, a problem of off-set in the simultaneous reading system can be solved without spoiling image data obtained from a reading target surfaces.

BRIEF DEDOCUMENTION OF THE DRAWINGS

The present invention will become more fully understood from the detailed dedocumention given hereinafter and the accompanying drawings which are given by way of illustration only, and thus are not intended as a definition of the limits of the present invention, and wherein.

DETAILED DEDOCUMENTION OF THE PREFERRED EMBODIMENTS

In the following, an image processing apparatus according to an embodiment of the present invention will be described with reference to the attached drawings.

Figure 1:
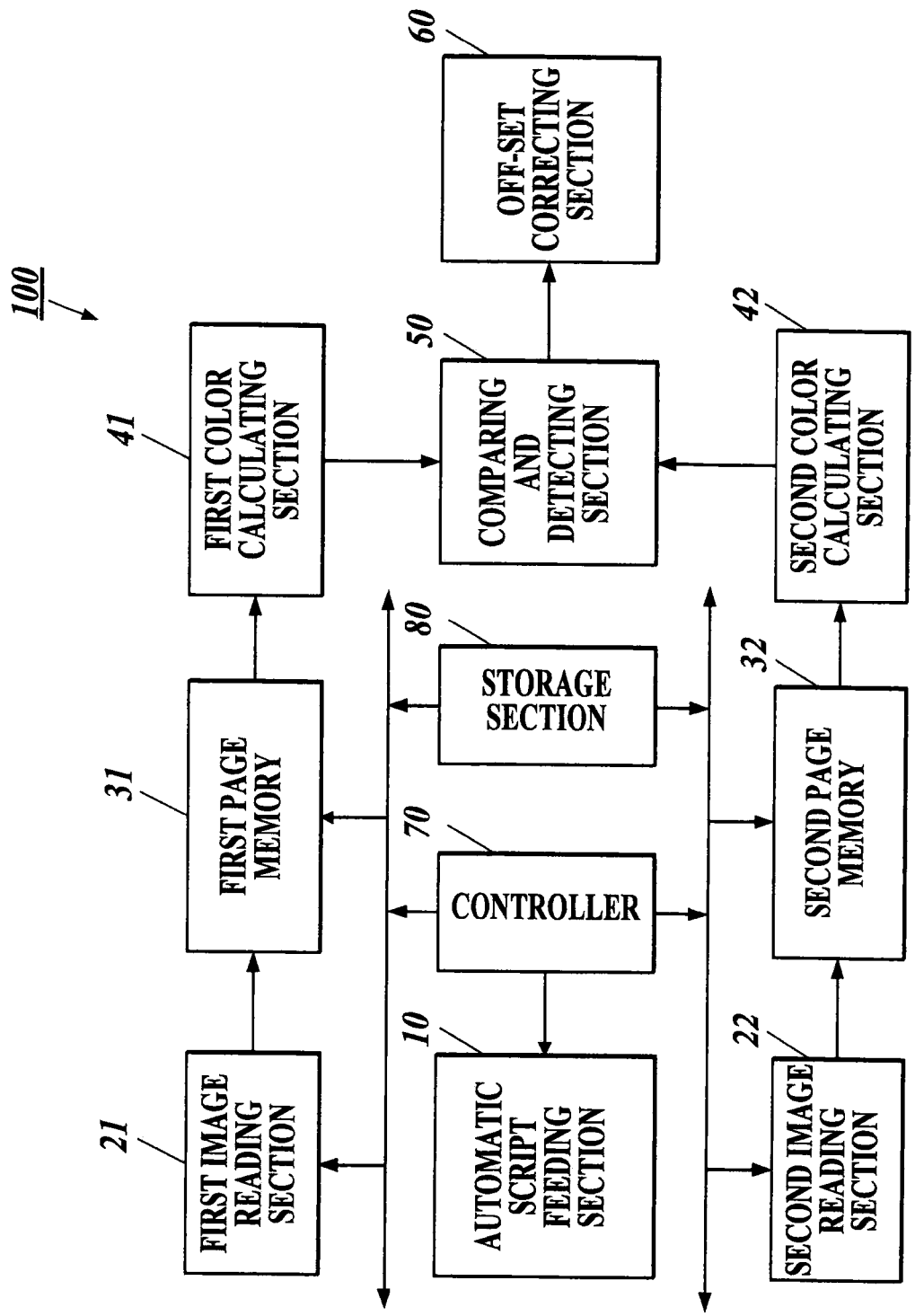
FIG. 1 is a functional block diagram of an image processing apparatus according to an embodiment of the present invention.

FIG. 1 shows a functional block diagram of an image processing apparatus 100 according to an embodiment of the present invention.

The image processing apparatus 100 includes an automatic document feeding section 10, a first image reading section 21 and a second image reading section 22, a first page memory 31 and a second page memory 32, a first color calculating section 41 and a second color calculating section 42, a comparing and detecting section 50, off-set correcting section 60, a controller 70, and a storage section 80.

The automatic document feeding section 10 includes a document tray, a pair of introduction rollers, a pair of feeding rollers, a platen glass, a pair of discharging rollers, and a discharge tray (none of them are shown).

The automatic document feeding section 10 feeds a document along a predetermined path at a speed and timing that the first image reading section 21 and the second image reading section 22 can read the document under the control of the controller 70.

The respective first image reading section 21 and the second image reading section 22 includes a light source, a rod lens array, a contact image sensor (CIS), or the like. Incidentally, configurations of the two image reading section may differ from each other e.g. the image reading section 22 may include a scanning light source section, a scanning mirror section, an imaging lens, a CCD image sensor, or the like (none of them are shown).

Each of the first image reading section 21 and the second image reading section 22 is arranged at respective position to face with each other across a document set on the automatic document feeding section 10. Hereinafter, the embodiment will be explained based on the premise that the first image reading section 21 reads a front surface of the document and the second reading section 22 reads a rear surface of the document.

The first image reading section 21 reads an image of the front surface of the document to execute necessary processing such as offset correction or the like to the read image signal (analog signal). Then, the first image reading section 21 converts the image signal to a digital signal by an A/D converter (not shown) so as to generate image data.

The first image reading section 21 outputs the generated image data to the first page memory 31. Incidentally, the second reading section 22 similarly outputs image data of the rear surface of the document to the second page memory 32.

The first page memory 31 temporarily stores image data of the front surface of the document output from the first image reading section 21. Incidentally, the second page memory 32 stores image data of the rear surface of the document output from the second image reading section 22.

The first color calculating section 41 executes color measurement to the image data of the front surface of the document output from the first page memory 31.

The color includes three components of brightness, hue and chroma. The color measurement is to quantify the brightness, hue and chroma, respectively, in various color systems.

The color system is, generally, a method for expressing color of an object or a light source numerically or in symbols. For example, there are a Munsell color system, an L*a*b* color system, an L*C*h* color system, a hunter L*a*b* color system, an XYZ color system, or the like. Incidentally, an L*a*b* color system is applied in this embodiment, but any color system may be applied.

The second color calculating section 42 similarly executes color measurement to the image data of the rear surface of the document.

The comparing and detecting section 50 detects a pixel (hereinafter, referred to as "an off-set arisen pixel") by comparing two image data of the document output from the first color calculator 41 and the second color calculator 42, on a pixel to pixel basis.

To put it concretely, the comparing and detecting section 50 calculates difference value of brightness and chroma of the two pixels about the compared both sides of the document to judge whether the calculated difference value is equal to or more than a predetermined threshold value. The predetermined threshold value is stored in the storage section 80 as threshold information. Then, the comparing and detecting section 50 detects one of the compared two pixels as an off-set arisen pixel, if the difference value is equal to or more than the threshold value. Pixel to be detected is a larger one in brightness in the range of 0-100, which means a brighter pixel, and a pixel closer to yellow in hue circle.

The off-set correcting section 60 corrects brightness, hue and chroma to the off-set arisen pixel detected by the comparing and detecting section 50. Incidentally, the off-set correcting section 60 executes correction based on a look-up table (LUT) pre-stored in the storage section 80. A correcting amount corresponding to a difference value calculated by the comparing and detecting section 50 is defined in the LUT.

The controller 70 includes CPU, ROM, RAM, a memory, a motor driver, a light source driver, or the like (none of them are shown).

Moreover, the controller 70 controls overall processes to be executed in the automatic document feeding section 10, the first image reading section 21 and a second image reading section 22, the first page memory 31 and the second page memory 32, the first color calculating section 41 and the second color calculating section 42, the comparing and detecting section 50, and the off-set correcting section 60.

The storage section 80 stores programs, data obtained when the programs are executed, or the like. Moreover, the storage section 80 also stores LUT defining data of threshold values or reference values needed by the comparing and detecting section 50 when detecting the off-set arisen pixels, and a correction amount.

Figure 2:
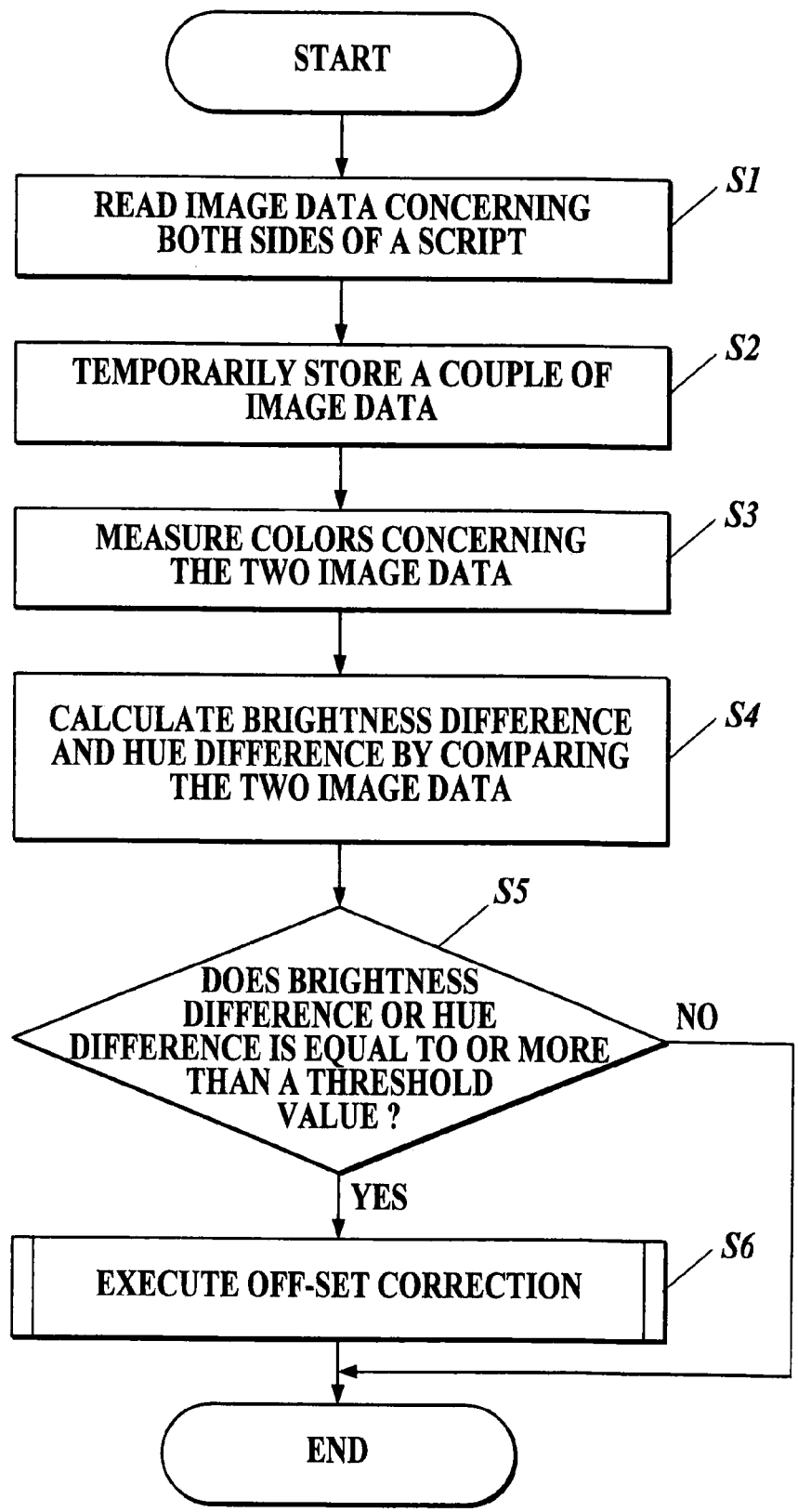
FIG. 2 is a flowchart showing behavior of the image processing apparatus according to an embodiment of the present invention.

Next, behavior of the image processing apparatus 100 according to the embodiment will be explained with reference to FIG. 2.

The automatic document feeding section 10 feeds a document along a feeding path by a predetermined distance according to an instruction of the controller 70. In this occasion, the controller 70 causes the first reading section to read the front surface of the document and to causes the second reading section to read the rear surface of the document (step S1).

The first reading section 21 and the second reading section 22 respectively executes signal processing such as an offset correcting, an amplification correcting, a denoising correcting, or the like to an image signal composed of a read analog signal according to an instruction of the controller 70. Subsequently, the first reading section 21 executes an A/D conversion to image signals processed by various signal processing to generate image data regarding the front surface of the document. The second image reading section 22 similarly generates image data regarding the rear surface of the document.

The first image reading section 21 outputs generated image data to the first page memory 31 and the second image reading section 22 outputs generated image data to the second page memory 32 (step S2).

The first page memory 31 and the second page memory 32 temporarily store the respective image data. Subsequently, the first page memory 31 outputs the stored image data to the first color calculating section 41 and the second page memory 32 outputs the stored image data to the second color calculating section 42.

The first color calculating section 41 calculates brightness, hue and chroma of the image data, output from the first page memory 31, regarding the front surface of the document according to an instruction of the controller 70 (step S3).

The second color calculating section 42 similarly calculates brightness, hue and chroma of the image data regarding the rear surface of the document.

The first color calculating section 41 outputs information about brightness, hue and chroma of the image data regarding the front surface of the document to the comparing and detecting section 50 on a pixel to pixel basis, and the second color calculating section 42 similarly outputs information about brightness, hue and chroma of the image data regarding the rear surface of the document to the comparing and detecting section 50 on a pixel to pixel basis.

The comparing and detecting section 50 compares brightness and hue among the brightness, hue and chroma of the image data, output from the first color calculating section 41 and the second color calculating section 42, regarding both sides of the document on a pixel to pixel basis according to an instruction of the controller 70 (step S4). Incidentally, the comparison results obtained by the comparing and detecting section 50 are difference values of brightness and hue, respectively.

Figure 3:
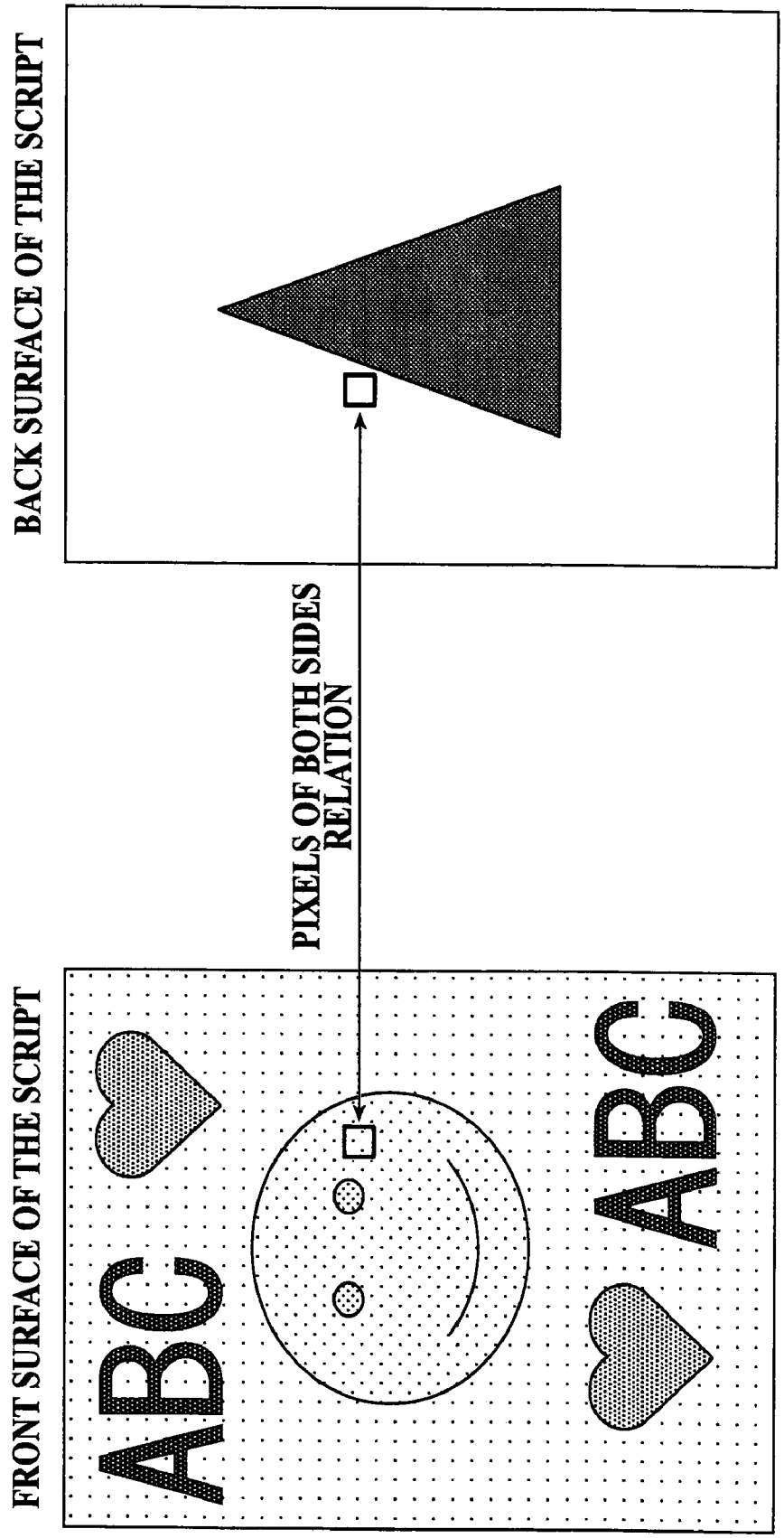
FIG. 3 is an explanatory drawing showing a positional relationship between two pixels to be compared.

FIG. 3 shows an exemplary two pixels to be compared.

The two pixels, which the comparing and detecting section 50 compares, are the pixels, one of which is in the front surface of the document and the other is in a corresponding position thereof in the rear surface of the document. The comparing and detecting section 50 calculates brightness and hue of the two pixels, respectively, and further compares respective calculated brightness and respective calculated hue so as to calculate difference values of brightness and hue between the two pixels.

The comparing and detecting section 50 judges whether the respective difference values of the calculated brightness and hue of image data regarding both sides of the document is equal to or more than the respective predetermined threshold values or not (step S5).

If the comparing and detecting section 50 judges that the respective difference values of brightness and hue is lower than the predetermined threshold values (step S5; No), the comparing and detecting section 50 ends the present processing.

Meanwhile, if the comparing and detecting section 50 judges that the difference value of brightness or the difference value of hue is equal to or more than the respective predetermined threshold value, the comparing and detecting section 50 performs the next process.

Here, a threshold value to be criterion for judging may be obtained by way of experiment to be pre-stored in the storage section 80, or may be arbitrarily set by a user through an operating section (not shown). Moreover, different threshold values may be applied corresponding to thickness of a sheet used as the document.

Figure 4:
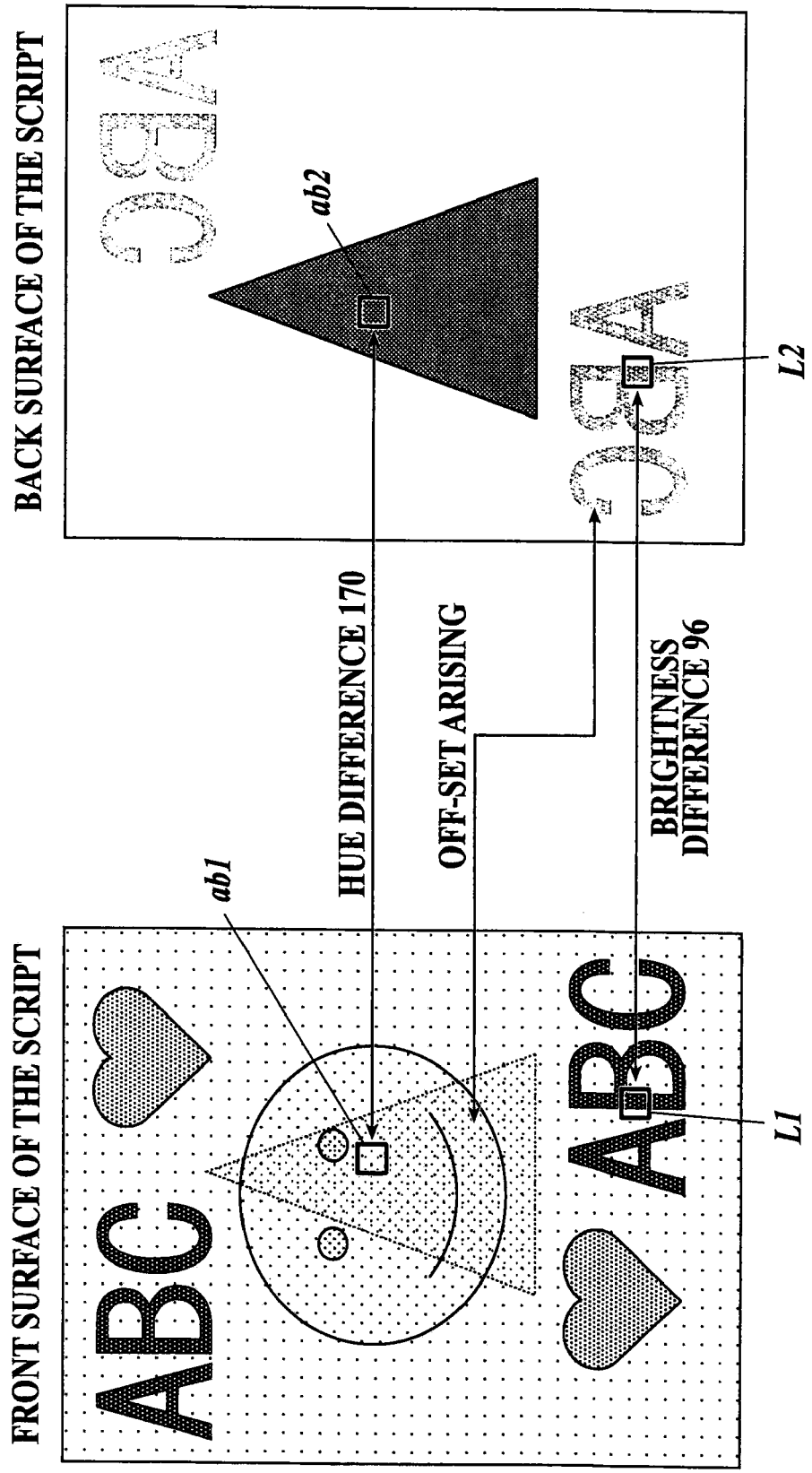
FIG. 4 is a drawing showing an example of a document, on which off-set arises, with brightness difference and hue difference being equal to or more than a threshold value.

FIG. 4 shows an example of the document including pixels, the respective difference values of brightness and hue of which are respectively equal to or more than the threshold value.

If a color of pixel L1 of the front surface of the document is black (brightness=0) and a color of pixel L2 of the rear surface of the document is light gray (brightness=96), then, difference value of brightness is "96". When the threshold value of difference value of brightness is set to be "50", then, the difference value of brightness is more than the threshold value. Therefore, the off-set correcting section 60 executes an off-set correction regarding brightness to an off-set arisen pixel at following step S6 (Note that, in FIG. 4, off-set arises because a pixel having larger value in brightness, that is a pixel of light gray, is image-formed as it is for the reason that an off-set correction has not executed to the off-set arisen pixel L2).

Moreover, if a color of pixel ab1 of the front surface of the document is yellow (hue=100 degree) and a color of pixel ab2 of the rear surface of the document is blue (hue=270 degree), then, difference value of hue is "170 degree". When the threshold value of difference value of hue is set to be "90 degree", the difference value of hue is more than the threshold value. Therefore, the off-set correcting section 60 also executes an off-set correction regarding hue to an off-set arisen pixel at following step S6 (Note that, in FIG. 4, off-set arises on a pixel having hue closer to yellow for the reason that an off-set correction has not executed to the off-set arisen pixel ab1).

Incidentally, in respect of hue, the more closer to yellow in hue circle, the more likely off-set arises, and the more farther from yellow, the more harder off-set arises.

Referring back to FIG. 2, the comparing and detecting section 50 outputs information about detected off-set arisen pixel to the off-set correcting section 60. The off-set correcting section 60 executes off-set correction according to the received information (step S6).

The off-set correcting section 60 corrects any one of brightness, hue and chroma of the off-set arisen pixel.

Hereinafter, an off-set arisen pixel detected by the comparing and detecting section 50 and a correction of brightness, hue and chroma executed by the off-set correcting section 60 to the off-set arisen pixel will be described.

If the difference value of brightness is lower than a threshold value and the difference value of hue is equal to or more than a threshold value, the comparing and detecting section 50 detects one or both of the compared pixels as an off-set arisen pixel. Then, the off-set correcting section 60 corrects the detected off-set arisen pixels.

Figure 5:
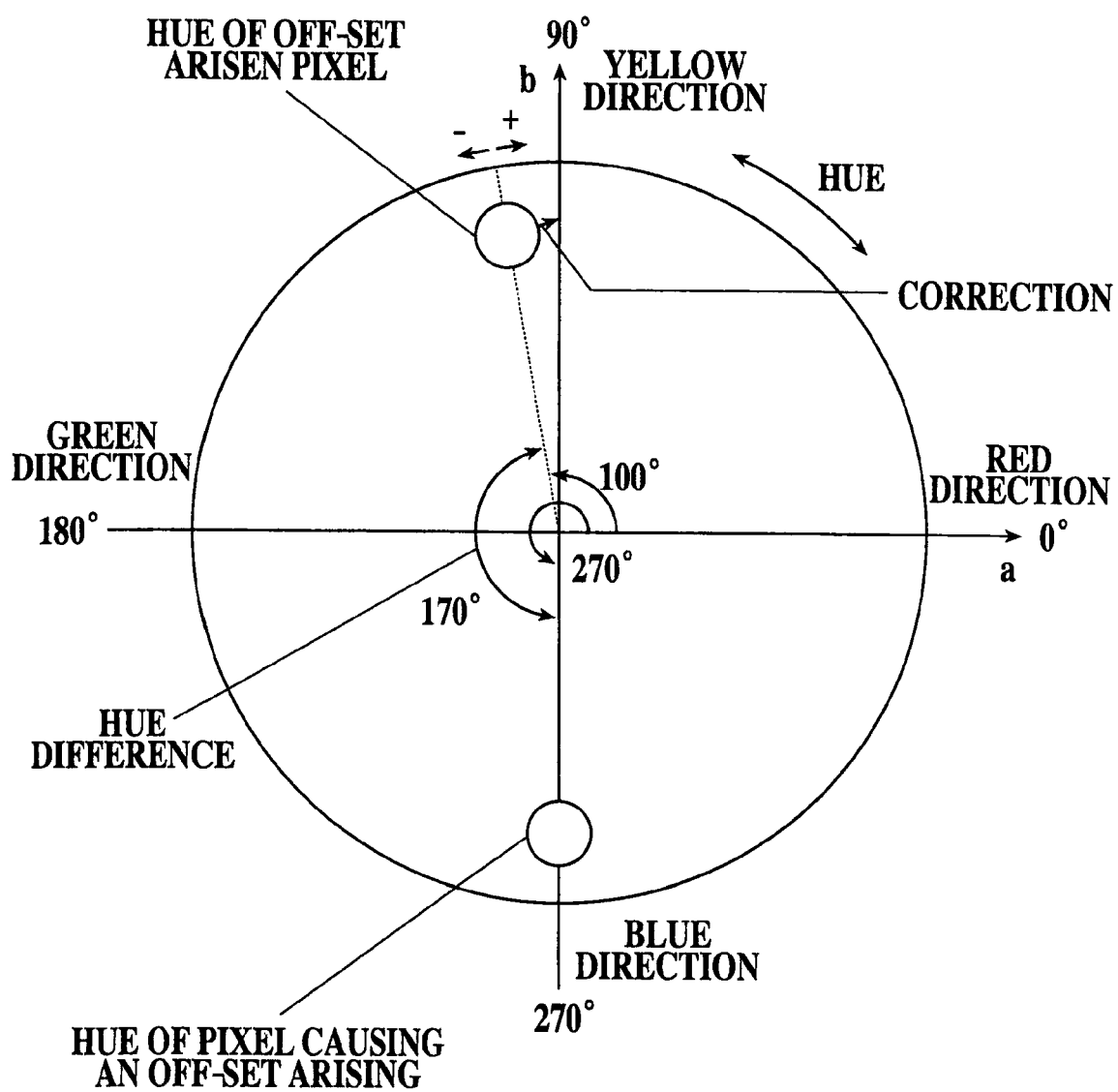
FIG. 5 is a drawing showing a hue circle explaining direction for correcting pixel, on which off-set arises.

Here, a location of the two pixels in hue circle is shown in FIG. 5.

The pixel ab1 detected by the comparing and detecting section 50 as an off-set arisen pixel is located around a yellow direction. Meanwhile, the pixel ab2 that causes off-set to be arisen is located around a blue direction. Moreover, a hue of the pixel ab1 is 100 degree with reference to a red direction and a hue of the pixel ab2 is 270 degree with reference to the same. If any of the compared two pixels is in a yellow region (within 75-105 degree), the comparing and detecting section 50 detects the pixel as an off-set arisen pixel. Meanwhile, if neither of the hue of the compared two pixels is in the yellow region, the comparing and detecting section 50 detects both of the pixels as off-set arisen pixels. The off-set correcting section 60 corrects hue and chroma of the detected off-set arisen pixels.

If the difference value of brightness is equal to or more than the threshold value and the difference value of hue is equal to or more than the threshold value, the comparing and detecting section 50 detects brighter pixel as an off-set arisen pixel. Then, the off-set correcting section 60 corrects the detected off-set arisen pixels.

Moreover, if brightness of the brighter pixel is lower than a first reference value (brightness=50 to 75) and brightness of the darker pixel is equal to or more than a second reference value (brightness=25 to 50), there is a possibility that off-set arises even to the darker pixel result from hue. Therefore, the comparing and detecting section 50 detects both of the pixels as off-set arisen pixels. Then, the off-set correcting section 60 corrects brightness, hue and chroma of the off-set arisen pixels.

Correcting amount regarding the relationship between respective difference values of brightness or hue and respective threshold values is defined based on the LUT pre-stored in the storage section 80. The LUT defines that the more the difference of brightness is, the more the correcting amount is and the less the difference of brightness is, the less the correcting amount is. Moreover, the storage section 80 may store an LUT defining that the thicker the sheet used as the document is, the less the correcting amount is, and the thinner the sheet is, the more the correcting amount is.

The correcting amount regarding the relationship between difference value of hue and threshold value is defined so that the hue of the off-set arisen pixel to be shifted more closer to yellow.

To put it concretely, the LUT defines that if the difference value of hue between the compared pixels is equal to or more than 180 degree, the hue of the off-set arisen pixel is corrected to minus direction, and if the difference value of hue between the compared pixels is lower than 180 degree, the hue of the off-set arisen pixel is corrected to a plus direction.

For example, in FIG. 5, the difference value of hue is 170 degree. Therefore, the correcting section 60 corrects the hue of the pixel ab1 to a plus direction according to a definition in the LUT. Incidentally, a plurality of LUTs, which respectively stores different correction amount corresponding to color regions, may be stored in the storage section 80 and the off-set correcting section 60 may select proper LUT by referring hue of the pixel, which cause the off-set to be arisen.

Moreover, the off-set correcting section 60 executes smoothing processing to the off-set arisen pixels. The smoothing processing may be executed after having corrected the off-set arisen pixel, or may be executed by adding correction amount to a mean value of the pixels around the off-set arisen pixels, the mean value being calculated when smoothing pixels. Moreover, the comparing and detecting section 50 can detect not only the off-set arisen pixels but also pixels around the off-set arisen pixels as an off-set arisen region. In this case, the off-set correcting section 60 may execute smoothing processing to a pixel located at an edge portion of the off-set arisen region. By executing smoothing processing to the pixel at the edge portion, an outline or tone jump generated by executing off-set correction by the off-set correcting section 60 can be prevented.

Although, the above described off-set correction executed by the off-set correcting section 60 is assumed that both sides of the document have respective image, but is not limited to the case. For example, the image processing apparatus 100 may further include an operating section, and whether the off-set correction should be executed or not may be selectable by a user through the operating section. In this case, even if the image is only in front surface of the document, the controller 70 instructs the second image reading section 22 to generate image data of the rear surface of the document and instructs the off-set correcting section 60 to execute off-set correction.

The controller 70 ends the processing after causing the off-set correcting section 60 to execute necessary correcting processing.

As described above, according to an embodiment of the present invention, the comparing and detecting section 50 can exactly detect the off-set arisen pixel by comparing two image data of both sides of the document, respectively. The off-set correcting section 60 corrects at least any one of brightness, hue and chroma of the pixel after detecting the off-set arisen pixels. The correction at this moment is executed by assuming brightness, hue and chroma of an original image data. Therefore, the off-set correcting section 60 can execute off-set correction without spoiling image data obtained from a reading target surface.

Moreover, the image processing apparatus 100 adopts method for calculating difference values of brightness and hue of two pixels corresponding to each other in both sides of the document. This leads the comparing and detecting section 50 detects off-set arisen pixels by simple calculation.

Moreover, the off-set correcting section 60 can execute an accurate off-set correction to the compared pixels in case that the off-set arisen pixel is caused by a brightness difference between the compared pixels.

Moreover, the off-set correcting section 60 can execute an accurate off-set correction to the compared pixels in case that the off-set arisen pixel is caused by a hue difference between the compared pixels.

Moreover, the off-set correcting section 60 can execute an accurate off-set correction to the compared pixels in case that the off-set arisen pixel is caused by brightness difference and hue difference between the compared pixels.

Moreover, the correction amount for the off-set correction is defined based on the LUT. That is, the correction amount differs corresponding to an extent that the off-set arisen pixel off-sets. Therefore, a standardized correction by a fixed correction amount can be prevented, and the off-set correction can be executed without spoiling image data obtained from the reading target surface.

Moreover, the off-set correcting section 60 can execute smoothing processing to the pixels around the off-set arisen pixels according to information about brightness, hue and chroma of the off-set corrected pixels. This leads the off-set correcting section 60 to execute off-set correction without spoiling image data obtained from the reading target surface, and the outline or tone jump generated by executing off-set correction by the off-set correcting section 60 can be prevented.

Moreover, not only the off-set arisen pixels, but also an off-set arisen region around the off-set arisen pixels and pixels in the edge portion thereof can be exactly detected.

Moreover, a smoothing processing can be executed to the pixels located in the edge portion of the off-set arisen pixels. This leads the outline or tone jump generated by the off-set correction to be prevented.

Moreover, whether the off-set correction should be executed or not may be arbitrarily selectable by a user through the operating section.

The entire disclosure of Japanese Patent Application No. 2008-013794 filed on Jan. 24, 2008 including dedocumention, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing apparatus, comprising:
 a comparing and detecting section for comparing two image data, which respectively obtained by nearly simultaneously reading both sides of a document, on a pixel to pixel basis and detecting a pixel, on which offset arises, from the two image data based on a comparison result obtained by comparing the two image data; and a correcting section for correcting at least any one of brightness, hue and chroma of the detected pixel based on information including brightness and hue of the detected pixel, wherein the comparing and detecting section calculates a first difference value of brightness and a second difference value of hue between pixels respectively corresponding to each other in both sides of the document, as the comparison result, when comparing the two image data on a pixel to pixel basis, and detects a pixel of one side or both sides of the document as a pixel, on which off-set arises, if the calculated first or second difference value is equal to or more than a predetermined threshold value.

2. The image processing apparatus of claim 1, further comprising: an operating section for instructing a correction of the pixel, on which off-set arises.

3. The image processing apparatus of claim 1, wherein the comparing and detecting section detects a brighter pixel from pixels of the compared two image data as a pixel, on which off-set arises, when the first difference value is equal to or more than a predetermined threshold value and the second difference value is lower than a predetermined threshold value; and the correcting section corrects brightness and chroma of the detected pixel.

4. The image processing apparatus of claim 1, wherein the comparing and detecting section detects a pixel having hue in a yellow domain as a pixel, on which off-set arises, if the first difference value is lower than a predetermined threshold value and the second difference value is equal to or more than a predetermined threshold value, and detects pixels of both sides of the document as pixels, on which off-set arises, if the pixel having hue in a yellow domain is not detected, and the correcting section corrects brightness and chroma of the detected pixel or pixels.

5. The image processing apparatus of claim 1, wherein the comparing and detecting section detects a brighter pixel from the compared two pixels as a pixel, on which off-set arises, if the first difference value is equal to or more than a predetermined threshold value and the second difference value is equal to or more than a predetermined threshold value, and the correcting section corrects brightness, hue and chroma of the detected pixel.

6. The image processing apparatus of claim 1, wherein the comparing and detecting section detects not only a brighter pixel but also a darker pixel from the compared two pixels as pixels, on which off-set arises, if brightness of the brighter pixel value is lower than a predetermined first reference value and brightness of the darker pixel value is equal to or more than a predetermined second reference value, and the correcting section corrects brightness, hue and chroma of the detected pixels.

7. The image processing apparatus of claim 1, further comprising:

a storage section for storing a look-up table (LUT) defining correction amount corresponding to the first or second difference value calculated by the comparing and detecting section, wherein the correcting section corrects at least any one of brightness, hue and chroma of the pixel, on which off-set arises, based on the LUT pre-stored in the storage section.

8. The image processing apparatus of claim 1, wherein the correcting section executes a smoothing processing to the pixel detected by the comparing and detecting section by calculating an average value of the pixel and a peripheral pixel thereof after correcting the off-set of the pixel.

9. The image processing apparatus of claim 1, wherein the comparing and detecting section further detects a region, on which off-set arises, and a pixel corresponding to an edge portion of the region, as well as detecting the pixel, on which off-set arises.

10. The image processing apparatus of claim 9, wherein the correcting section executes a smoothing processing to the pixel corresponding to the edge portion by calculating an average value of peripheral pixels located internally and exteriorly of the region.

11. A method for image processing, comprising:

a detecting step by a comparing and detecting section comparing two image data, which respectively obtained by nearly simultaneously reading both sides of a document, on a pixel to pixel basis and detecting a pixel, on which off-set arises, from the two image data based on a comparison result obtained by comparing the two image data; and a correcting step by a correcting section correcting at least any one of brightness, hue and chroma of the detected pixel based on information including brightness and hue of the detected pixel, wherein the detecting step calculates a first difference value of brightness and a second difference value of hue between pixels respectively corresponding to each other in both sides of the document, as the comparison result, when comparing the two image data on a pixel to pixel basis, and detects a pixel of one side or both sides of the document as a pixel, on which off-set arises, if the calculated first or second difference value is equal to or more than a predetermined threshold value.

12. The method of claim 11, wherein the correcting step executes a smoothing processing to the pixel detected in the detecting step by calculating an average value of the pixel and a peripheral pixel thereof after correcting the off-set of the pixel.

13. The method of claim 11, wherein the detecting step further detects a region, on which off-set arises, and a pixel corresponding to an edge portion of the region, as well as detecting the pixel, on which off-set arises.

14. The method of claim 11, wherein the detecting step detects a brighter pixel from the compared two pixels as a pixel, on which off-set arises, when the first difference value is equal to or more than a predetermined threshold value and the second difference value is lower than a predetermined threshold value; and the correcting step corrects brightness and chroma of the detected pixel.

15. The method of claim 11, wherein the detecting step detects a pixel having hue in a yellow domain as a pixel, on which off-set arises, if the first difference value is lower than a predetermined threshold value and the second difference value is equal to or more than a predetermined threshold value, and detects pixels of both sides of the document as pixels, on which off-set arises, if the pixel having hue in a yellow domain is not detected, and the correcting step corrects brightness and chroma of the detected pixel or pixels.

16. The method of claim 11, wherein the detecting step detects a brighter pixel from the compared two pixels as a pixel, on which off-set arises, if the first difference value is equal to or more than a predetermined threshold value and the second difference value is equal to or more than a predetermined threshold value, and the correcting step corrects brightness, hue and chroma of the detected pixel.

17. The method of claim 11, wherein the detecting step detects not only a brighter pixel but also a darker pixel from the compared two pixels as pixels, on which off-set arises, if brightness of the brighter pixel is lower than a predetermined first reference value and brightness of the darker pixel value is equal to or more than a predetermined second reference value, and the correcting step corrects brightness, hue and chroma of the detected pixels.

18. The method of claim 11, further comprising a storing step of:

storing a storage section with a look-up table (LUT) defining correction amount corresponding to the first or second difference value calculated in the detecting step, wherein the correcting step corrects at least any one of brightness, hue and chroma of the pixel, on which off-set arises, based on the LUT pre-stored in the storing step.

* * * * *